US011560452B2

United States Patent
Bessel et al.

(10) Patent No.: US 11,560,452 B2
(45) Date of Patent: Jan. 24, 2023

(54) MONOEPOXIDE-MONOAMINE ADDUCTS AS WETTING AGENTS AND DISPERSANTS

(71) Applicant: BYK-Chemie GmbH, Wesel (DE)

(72) Inventors: Michael Bessel, Wesel (DE); Marcus Meichsner, Wesel (DE); Carsten Nagel, Wesel (DE); Maya Sanchez Y Sosa, Wesel (DE); Christian Biecker, Wesel (DE); Peter Stannek, Wesel (DE)

(73) Assignee: BYK-Chemie GmbH, Wesel (DE)

( * ) Notice: Subject to any disclaimer, the term of this patent is extended or adjusted under 35 U.S.C. 154(b) by 272 days.

(21) Appl. No.: 16/499,890

(22) PCT Filed: Mar. 28, 2018

(86) PCT No.: PCT/EP2018/058025
§ 371 (c)(1),
(2) Date: Oct. 1, 2019

(87) PCT Pub. No.: WO2018/184961
PCT Pub. Date: Oct. 11, 2018

(65) Prior Publication Data
US 2020/0115497 A1 Apr. 16, 2020

(30) Foreign Application Priority Data
Apr. 5, 2017 (EP) .................... 17165088

(51) Int. Cl.
*C08G 65/26* (2006.01)
*C09K 23/16* (2022.01)
*C08G 65/331* (2006.01)
*C08G 65/00* (2006.01)

(52) U.S. Cl.
CPC .......... *C08G 65/2624* (2013.01); *C09K 23/16* (2022.01)

(58) Field of Classification Search
None
See application file for complete search history.

(56) References Cited

U.S. PATENT DOCUMENTS

| | | | |
|---|---|---|---|
| 3,689,531 | A | 9/1972 | Critchfield |
| 4,777,195 | A | 10/1988 | Hesse |
| 4,795,796 | A | 1/1989 | Haubennestel |
| 6,111,054 | A | 8/2000 | Haubennestel |
| 7,312,260 | B2 | 12/2007 | Krappe et al. |
| 8,653,222 | B2 | 2/2014 | Orth et al. |
| 9,206,347 | B2 | 12/2015 | Weerasooriya et al. |
| 9,217,083 | B2 | 12/2015 | Hans et al. |
| 9,340,641 | B2 | 5/2016 | Orth et al. |
| 9,580,616 | B2 | 2/2017 | Fornara |

(Continued)

FOREIGN PATENT DOCUMENTS

| | | |
|---|---|---|
| EP | 0270126 | 6/1988 |
| EP | 0893155 | 1/1999 |

(Continued)

OTHER PUBLICATIONS

Huntsman, "Technical Bulletin Jeffamine M-600 Polyetheramine," pp. 1-2, copyright 2008 (Year: 2008).*

(Continued)

*Primary Examiner* — Randy P Gulakowski
*Assistant Examiner* — Ha S Nguyen
(74) *Attorney, Agent, or Firm* — Fitch, Even, Tabin & Flannery LLP

(57) ABSTRACT

The invention relates to epoxide-amine adducts obtainable by reaction of one or more primary amines (A) of general formula (I)

$$Q\text{-}NH_2 \qquad (I)$$

with one or more monoepoxides (B) of general formula (II)

$$(II)$$

wherein Q is a radical $R'\text{-}[OEt]_n[OPr]_m[OBu]_s\text{-}$, in which $R'$ is a radical selected from alkyl radicals having 1 to 6 carbon atoms, OEt is an ethylene oxide radical, OPr is a propylene oxide radical and OBu is a butylene oxide radical, n is a number from 0 to 100, m is a number from 3 to 50 and s is a number from 0 to 20 and $n+m+s=3$ to 170, R is an organic radical selected from aliphatic radicals having 4 to 24 carbon atoms, aromatic radicals having 6 to 18 carbon atoms and araliphatic radicals having 7 to 34 carbon atoms, and p is 0 or 1, wherein (i) the primary amine(s) (A) and the monoepoxide(s) (B) are reacted in an equivalents ratio (A):(B) of from 1:2 to 1:1.35; and (ii) at least 40 mol % of the radicals R are selected from aromatic radicals having 6 to 18 carbon atoms and araliphatic radicals having 7 to 24 carbon atoms; and optionally subsequent salification and/or quaternization and/or modification of the reaction product. The invention furthermore relates to wetting agents and dispersants comprising or consisting of the epoxide-amine adducts and also to the production of the wetting agents and dispersants and to the use of the epoxide-amine adducts and the wetting agents and dispersants for the production of dispersions. The invention also relates to dispersions and particle formulations comprising the epoxide-amine adducts and wetting agents and dispersants.

10 Claims, No Drawings

(56) References Cited

U.S. PATENT DOCUMENTS

| | | |
|---|---|---|
| 10,301,486 B2 | 5/2019 | Gobelt et al. |
| 2003/0027873 A1 | 2/2003 | Thetford |
| 2005/0020735 A1* | 1/2005 | Krappe ................ C09D 17/005 523/440 |
| 2006/0089426 A1 | 4/2006 | Haubennestel et al. |
| 2012/0059088 A1 | 3/2012 | Hilfiger |
| 2013/0231418 A1 | 9/2013 | Hilfiger |
| 2017/0190840 A1 | 7/2017 | Göbelt |
| 2017/0233660 A1* | 8/2017 | Soane ................... C10G 21/16 208/390 |

FOREIGN PATENT DOCUMENTS

| | | | |
|---|---|---|---|
| EP | 1650246 | A1 | 4/2006 |
| EP | 1486524 | B1 | 12/2010 |
| EP | 1745104 | B1 | 11/2011 |
| JP | 2000512795 | | 9/2000 |
| JP | 2009256583 | A * | 11/2009 |
| JP | 2011224562 | | 11/2011 |
| WO | 9534593 | | 12/1995 |
| WO | 9719948 | | 6/1997 |
| WO | 9955763 | | 11/1999 |
| WO | 2008092687 | A1 | 8/2008 |
| WO | 2008116932 | | 10/2008 |
| WO | 2009081528 | | 7/2009 |
| WO | 2011070074 | A1 | 6/2011 |
| WO | 2012049186 | A1 | 4/2012 |
| WO | 2016059066 | A1 | 4/2016 |

OTHER PUBLICATIONS

Huntsman, "Technical Bulletin Jeffamine M-1000 Polyetheramine," pp. 1-2, copyright 2007 (Year: 2007).* https://chrysler.org/the-history-of-art-in-colors-brown/#:~:text=Asphaltum%20is%20a%20pigment%20made,term%20was%20indistinguishable%20from%20'bitumen, May 27, 2020 (Year: 2020).*

International Search Report and Written Opinion for International Application No. PCT/EP2018/058025 dated Jun. 21, 2018.

* cited by examiner

MONOEPOXIDE-MONOAMINE ADDUCTS AS WETTING AGENTS AND DISPERSANTS

The present invention relates to an epoxide-amine adduct suitable as wetting agent and dispersant, to the production thereof, to dispersions and pigment formulations comprising the epoxide-amine adduct and also to the use of the epoxide-amine adduct as wetting agent and dispersant.

Epoxide-amine-based adducts usable as wetting agents and dispersants are already known from several patent documents.

For instance, EP 1 486 524 A1 describes the production of epoxide adducts and their salts for use as dispersants. In particular, epoxide-amine adducts are described which are obtainable by the reaction of mono- or polyfunctional aromatic epoxides with primary or secondary polyoxyalkylenemonoamines having a number-average molecular weight of more than 400 g/mol. The degree of conversion of the epoxide groups should be 90% to 100% and the proportion by weight of aromatic groups in the addition compounds should not be more than 50% by weight. In the inventive examples of EP 1 486 524 A1, only polyepoxides were reacted with polyoxyalkylenemonoamines. The reaction of primary polyoxyalkylenemonoamines in direct combination with aromatic monoepoxides has not been disclosed.

EP 1 650 246 A1 in example 19 discloses the reaction product of an aromatic monoepoxide (styrene oxide) with secondary monoamine (ethylethanolamine) and the subsequent alkoxylation of the product with ethylene oxide and propylene oxide.

EP 1 745 104 A1 discloses comb-type polyetheralkanolamines as dispersants for inks and printing inks. These are obtained, as in EP 1 486 524 A1, by reacting monofunctionally amine-terminated polyethers with diglycidyl ethers.

WO 2012/049186 discloses epoxide-amine adducts which necessarily have polysiloxane side chains. Polyepoxides are used in the preparation of these epoxide-amine adducts. In addition, polysiloxane-free amines can also be used, these also including monoamine-functional polyoxyalkyleneamines or diamines bearing tertiary and primary amino groups.

WO 2008/092687 A1 discloses wetting agents and dispersants based on isocyanate monoadducts. These are obtained by reaction of a polyepoxide with an aliphatic or araliphatic primary amine that can additionally bear functional groups, and subsequent reaction with a polyether-group-bearing monoisocyanate at secondary amino groups or secondary hydroxyl groups, wherein the attachment of the polyether groups takes place with the formation of urea groups or urethane groups.

WO 2011/070074 A1 describes epoxide-amine adducts that are obtainable by the reaction of diglycidyl ethers with polyoxyalkylenemonoamines bearing primary amine groups and aliphatic or araliphatic primary amines that may also bear tertiary amino groups. These precursors are reacted with monoisocyanates bearing ester and/or ether groups in order to obtain the wetting agents and dispersants described as target compounds in WO 2011/070074 A1.

WO 2016/059066 A1 describes epoxide-amine adducts that are formed by the addition reaction of diepoxide compounds with primary amines and in particular polyether monoamines, and their use as highly effective wetting and dispersing additives in paints and coatings. However, in contrast to the present invention, the epoxide-amine adduct additives disclosed in this document are produced by a statistical addition process and hence also comprise substantial proportions of relatively high-molecular-weight copolymers having considerably more than one polyether side chain, which are particularly suitable for the use for carbon black dispersions that is described there. In some application fields, such statistical copolymer mixtures exhibit poor compatibilities with the paint system, for example cloudiness or the formation of specks.

U.S. Pat. No. 9,206,347 B2 discloses surface-active substances based on quaternary ammonium compounds containing polyalkylene oxide structures terminated with hydrophobic $C_8$-$C_{150}$ alkyl radicals, which can be used in the field of oil production.

The wetting agents and dispersants should be usable in both aqueous and in solvent-based systems and contribute in general to outstanding dispersion of particulate solids. This also manifests itself by way of example in a minimal initial viscosity of the systems after incorporation of the particulate solids using the wetting agents and dispersants and also in a good long-term stability of the systems. Varnishes containing particulate solids should also have high gloss and feature very high transparency. The term wetting agent and dispersant is also used synonymously herein with the term dispersant or wetting agent and/or dispersant.

In addition, special requirements are placed on wetting agents and dispersants for plastics compositions. In this field of application it is critical that no volatile solvents are present and the wetting and dispersing additives used are liquid at room temperature. An extremely effective and efficient reduction in viscosity is sought in plastics compositions that are often extremely highly filled. In applications such as the production of polymer concrete compositions, polymer concrete tiles, the achievement of a good degassing rate and good leveling is also important. This positively influences the strength and surface properties of the polymer concrete tiles, in particular their gloss and freedom from bubbles.

The object of the present invention is therefore that of providing a high-quality wetting agent and dispersant having particularly good properties with regard to the stabilization of particle-containing dispersions, in particular for universally usable tinting pastes, in order to achieve broad compatibilities in many paints and coating formulations. In addition, a wetting agent and dispersant is to be provided which guarantees the effective and efficient reduction of viscosity in epoxide-based polymer concrete compositions and ensures outstanding degassing results and good leveling properties.

This object is surprisingly achieved by the provision of an epoxide-amine adduct producible by the reaction of
one or more primary amines (A) of general formula (I)

with one or more monoepoxides (B) of general formula (II)

wherein
Q is a radical R'-[OEt]$_n$[OPr]$_m$[OBu]$_s$-, in which
R' is a radical selected from alkyl radicals having 1 to 6 carbon atoms,
OEt is an ethylene oxide radical, OPr is a propylene oxide radical and OBu is a butylene oxide radical,
n is a number from 0 to 100, m is a number from 3 to 50 and s is a number from 0 to 20 and n+m+s=3 to 170,
R is an organic radical selected from aliphatic radicals having 4 to 24 carbon atoms, aromatic radicals having 6 to 18 carbon atoms and araliphatic radicals having 7 to 34 carbon atoms, and p is 0 or 1,
wherein
(i) the primary amine(s) (A) and the monoepoxide(s) (B) are reacted in a ratio (A):(B) of from 1:2 to 1:1.35, preferably 1:1.90 to 1:1.50, particularly preferably 1:1.85 to 1:1.70 and
(ii) at least 40 mol % of the radicals R are selected from aromatic radicals having 6 to 18 carbon atoms and araliphatic radicals having 7 to 24 carbon atoms, preferably aromatic radicals having 6 to 20 carbon atoms, particularly preferably aromatic radicals having 6 or 7 carbon atoms; and optionally subsequent
(a) salification and/or quaternization of the nitrogen atom introduced into the reaction product via formula (I); and/or
(b) reaction of the hydroxyl group, formed by ring opening of the epoxide ring of formula (II), and/or of the NH group, formed by equimolar reaction of a species of formula (I) with a species of formula (II), with one or more species selected from the group consisting of lactones, hydroxycarboxylic acids, lactides, monoepoxide compounds and monoisocyanates.

Since somewhat different products are obtained depending on the ratio of (A) to (B), the epoxide-amine adducts according to the invention cannot be better described than by the production process used to define them.

The species obtained by salification, quaternization, adduct formation with monoisocyanate compounds, etherification and/or esterification of the aforementioned epoxide-amine adducts are also included herein among the epoxide-amine adducts according to the present invention. All indications of concentration and amount used below in relation to the epoxide-amine adducts thus refer to the entirety of the epoxide-amine adducts irrespective of whether they are the unsalified, unquaternized, unmodified epoxide-amine adducts as have been described above or are the salification, quaternization and/or subsequently modified products thereof, as will be described in particular further below.

Primary Amines (A)

The primary amines (A) of formula (I)

$$Q\text{-}NH_2 \qquad (I)$$

are amines in which Q is a radical $R'\text{-}[OEt]_n[OPr]_m[OBu]_s\text{-}$.

Herein, the radical $R'$ terminates the alkyleneoxy chain $[OEt]_n[OPr]_m[OBu]_s$ and is selected from alkyl radicals having 1 to 6, preferably 1 to 4 carbon atoms. $R'$ is particularly preferably a methyl radical.

The index n is a number from 0 to 100, m is a number from 3 to 50 and s is a number from 0 to 20 and the sum of n+m+s is 3 to 170.

Preferably, n is a number from 5 to 75, m is a number from 3 to 40 and s is a number from 0 to 10. Particularly preferably, the sum of n+m+s=8 to 80, very particularly preferably 8 to 50, wherein the two aforementioned ranges for n+m+s also apply in the case where s=0.

Preferably, n>m>s. Particularly preferably, s=0.

Particularly preferably, s=0 and the ratio of n/m>1, better >2 and better still >3, such as, for example, 3 to 50.

The n [OEt]-, m [OPr]- and s [OBu] units can be arranged in any desired sequence. This includes in particular a statistical sequence or the arrangement in the form of [OEt], [OPr] and/or [OBu] blocks or an arrangement in the form of a gradient, for example an enrichment or depletion of [OEt] or of the other alkoxy units along the polyalkylene oxide chain.

Primary amines (A) of this kind are commercially available, for example, under the names Jeffamine® monoamines (M Series) and Surfonamine® from Huntsman. Examples include the products Jeffamine® M-600, Jeffamine® M-1000, Jeffamine® M-2005, Jeffamine® M-2070, Surfonamine® L100 and Surfonamine® L200.

The entirety of the primary amines (A) is also referred to herein as component (A) or simply as (A).

Monoepoxides (B)

In the monoepoxides (B) of general formula (II)

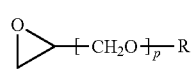

(II)

R is an organic radical selected from aliphatic radicals having 4 to 24 carbon atoms, aromatic radicals having 6 to 18 carbon atoms and araliphatic radicals having 7 to 34 carbon atoms, and p is 0 or 1.

When p=1, the monoepoxides are preferably glycidyl ethers or glycidyl esters, particularly preferably glycidyl ethers.

At least 40 mol %, preferably at least 50 mol %, particularly preferably at least 60 mol % or at least 75 mol % of all of the monoepoxides (B) used in the reaction have a radical R selected from aromatic and araliphatic radicals, particularly preferably from aromatic radicals. Very particularly preferably, at least 90 mol % or even 100 mol % of the radicals R, based on the entirety of the monoepoxides used, are selected from aromatic and araliphatic radicals, better still only from the group of the aromatic radicals.

Among the araliphatic radicals R, preference is given in particular to those containing 7 to 30 and very particularly preferably 7 to 11 carbon atoms.

Among the particularly preferred aromatic radicals R, preference is given in particular to those containing from 6 to 10 and very particularly preferably 7 or 8 carbon atoms, such as in particular phenyl and o-, m- and p-cresyl, very particularly preferably o-cresyl.

Besides the obligatory proportion of aromatic and/or araliphatic radicals R, monoepoxides (B) used may also be those having aliphatic radicals R. The term "aliphatic" herein encompasses cyclic and acyclic, saturated or unsaturated organic radicals apart from aromatic radicals. The radical R may contain heteroatoms here, such as, by way of example and in particular, oxygen atoms and/or sulfur atoms. The aforementioned radicals R are particularly preferably pure hydrocarbon radicals.

If the radical R is an acyclic aliphatic radical, R is preferably a hydrocarbon radical having 4 to 20 carbon atoms, in particular a linear or branched alkyl radical having 3 to 20, preferably 6 to 18 and particularly preferably 8 to 18 carbon atoms.

If the radical R is a cyclic aliphatic radical, this may be a hydrogenated aromatic or hydrogenated araliphatic radical. Cycloaliphatic radicals R preferably contain 4 to 10, particularly preferably 6 or 7 to 10 carbon atoms. In principle, all aromatic and araliphatic radicals are amenable to hydrogenation, especially those described further below.

Preferred monoepoxides (B) where p=1 are glycidyl ethers. Among these, those having an aromatic radical R are particularly preferred. Very particularly preferred representatives among these are the phenyl glycidyl ether (R=phenyl) and the cresyl glycidyl ether (R=cresyl), with the latter being most preferred. Particularly preferred glycidyl ethers having aliphatic radicals R are those which bear linear or branched alkyl radicals as radicals R. Among these, particular preference is given to those containing 4 to 20, very particularly preferably 8 to 18, more preferably still 10 to 16 carbon atoms in the alkyl radical. Particularly preferred examples of aliphatic glycidyl ethers that may be mentioned include n-butyl glycidyl ether, isobutyl glycidyl ether, tert-butyl glycidyl ether, 2-ethylhexyl glycidyl ether and the C13/15-alkyl glycidyl ethers.

Further monoepoxides (B) where p=1 are glycidyl esters, preferably glycidyl esters of aliphatic monocarboxylic acids preferably having 6 to 20, particularly preferably 8 to 16 and very particularly preferably having 8 to 12 carbon atoms, such as for example glycidyl esters of neodecanoic acid (Cardura E10 from Hexion).

A preferred aromatic monoepoxide (B) where p=0 is, for example, styrene oxide (R=phenyl).

Further monoepoxides (B) where p=0 are the cycloaliphatic cyclohexyl oxide and the acyclic aliphatic alpha-olefin oxides, having in particular 6 to 20, particularly preferably 8 to 18 carbon atoms, such as for example C8 olefin oxide, C16 olefin oxide and C18 olefin oxide (available under the trade name Vikolox® from Arkema).

Unless

The entirety of the monoepoxides (B) is also referred to herein as component (B) or simply as (B).

Preferred Epoxide-Amine Adducts

In general, the inventive unsalified, unquaternized and unmodified epoxide-amine adducts comprise one or more species of general formula (III)

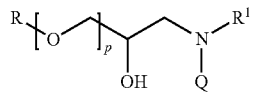
(III)

wherein
Q, R and p are as defined in formula (I), and
$R^1$ is H or a radical $CH_2$—CH(OH)—$[CH_2$—$O]_{p'}$—R, with the proviso that at least 33 mol %, preferably at least 50 mol %, particularly preferably at least 60 mol % and very particularly preferably at least 75 mol % of the radicals $R^1$ are $CH_2$—CH(OH)—$[CH_2$—$O]_{p'}$—R, in which p'=0 or 1.

These species represent the main constituent of the epoxide-amine adducts and are present in the reaction product of (A) and (B) in an amount of preferably at least 50% by weight, particularly preferably 60% by weight and very particularly preferably 70% by weight. Prior to any salification, quaternization or other modification possibly carried out, the epoxide-amine adduct very particularly preferably consists of species of general formula (III). Since the reaction product of (A) and (B) is an adduct, the weight of the reaction product corresponds herein to the sum total of the weights of the initially weighed-in quantities of (A) and (B). Any impurities present in (A) and/or (B) which cannot lead to a corresponding reaction product are not taken into account here.

If the monoepoxides (B) used are monoglycidyl ethers, p=1.

Inventive epoxide-amine adducts of general formulae (III) where p=0 are obtained when the epoxide compounds used are olefin monoxides.

For the preferred production of the linear amino-functional polymers according to the invention, monoepoxides (A) are used in a stoichiometric ratio such that, for 1 equivalent of primary amino group, between 1.35 and 2.0 equivalents of epoxide groups are reacted. The epoxide compounds are in this case generally fully reacted, suppressing the formation of products not covered by formula (III) by way of the reaction regime.

Salification and Quaternization Products of the Epoxide-Amine Adducts

The epoxide-amine adducts of the invention also include their salification and quaternization products. The tertiary and secondary amino groups present in the inventive epoxide-amine adducts can be reacted with acids HX to form ammonium salts—as shown in formula (IVa)—and with quaternizing agents, especially alkylating and/or aralkylating agents $R^2Y$ to form quaternary ammonium compounds—as shown in formula (IVb).

In formula (IVa)

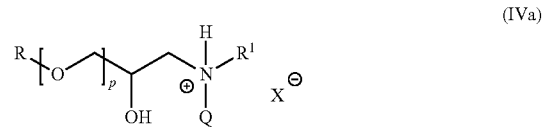
(IVa)

Q, R, $R^1$ and p are as are defined in formula (III), and $X^{\ominus}$ is an acid anion, preferably an acid anion of an acid selected from the group of the carboxylic acids, sulfonic acids and acidic phosphoric esters.

In formula (IVb)

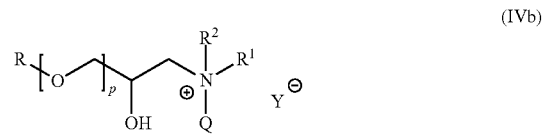
(IVb)

Q, R and p are as are defined in formula (III),
$R^1$ is $CH_2$—CH(OH)—$[CH_2$—$O]_{p'}$—R, in which p'=0 or 1,
$R^2$ is an aliphatic radical having 4 to 20 carbon atoms, an aromatic radical having 6 to 14 carbon atoms or araliphatic radical having 7 to 30 carbon atoms, and
$Y^{\ominus}$ is an anion selected from the group consisting of halides and sulfate or $Y^{\ominus}$ forms with the radical $R^2$ a radical $R^2$—$Y^{\ominus}$ in which $R^2$ is a radical $CH_2$ and $Y^{\ominus}$ is $COO^{\ominus}$.

If $Y^{\ominus}$ is a group $COO^{\ominus}$ which is covalently bonded to $R^2$, with $R^2$ being a methylene radical, this is also referred to as a betaine structure. In that case, the species of formula (IVb) is what is known as a zwitterion. Such a quaternization can for example be obtained by reacting a species of formula (III) with chloroacetic acid.

Therefore, the present invention additionally provides salts and quaternization products of the inventive epoxide-amine adducts.

For the salification of the epoxide-amine adducts according to the invention, organic or inorganic acids and acidic partial esters of the organic and inorganic acids can be used (HX). Examples of inorganic acids include hydrohalic acids, such as hydrochloric acid (HCl), sulfuric acids and phosphoric acids. However, preference is given to organic acids such as for example carboxylic acids, sulfonic acids and acidic phosphoric esters, such as for example mono- and diesters thereof.

For the quaternization of the epoxide-amine adducts according to the invention, all customary quaternizing agents can be used, such as, for example, alkylating agents.

Examples of suitable alkylating agents are alkyl and aralkyl halides and sulfates, such as benzyl chloride, methyl iodide or dimethyl sulfate. However, combinations of monoepoxide compounds and acids are also suitable as alkylating agents or aralkylating agents with which hydroxylated alkyl groups or hydroxylated aralkyl groups are introduced. Examples of monoepoxide compounds in this context are ethylene oxide, propylene oxide, butylene oxide, styrene oxide and glycidyl ethers, such as ethylhexyl glycidyl ether, phenyl glycidyl ether and cresyl glycidyl ether, or else alpha-olefin oxides, such as C8 olefin oxide or C16 olefin oxide.

Further Reaction Products of the Epoxide-Amine Adducts

The OH groups, which are formed by epoxide ring opening in the production of the epoxide-amine adducts (III), and are also present in the species of formulae (IVa) and (IVb), can by way of example react completely or partially with lactones, such as propiolactone, valerolactone, butyrolactone, caprolactone and/or alkylated, in particular methyl group-bearing, lactones, with opening of the lactone ring. The addition of a lactone molecule is carried out by methods known to those skilled in the art at temperatures of around 70° C. to 180° C. Particularly preferred lactones are ε-caprolactone and δ-valerolactone. If more than one lactone molecule is added onto such a hydroxyl group, this is also referred to as a ring-opening polymerization.

Besides lactones, it is in particular also possible to use lactides and hydroxycarboxylic acids, especially open-chain hydroxy fatty acids such as castor oil or ricinoleic acid, for esterification or polyester formation (analogously to lactone (poly)addition) with said hydroxyl groups, wherein a (poly) condensation reaction takes place in the case of the reaction with hydroxycarboxylic acids.

In addition, it is possible to carry out the alkoxylation reactions with monoepoxide compounds on a portion or all of said OH groups, this usually being performed under strongly basic conditions using catalysts such as KOH and at temperatures of 100° C. to 160° C. Examples of monoepoxide compounds in this context are ethylene oxide, propylene oxide, butylene oxide, styrene oxide and glycidyl ethers, such as ethylhexyl glycidyl ether, phenyl glycidyl ether and cresyl glycidyl ether, or else alpha-olefin oxides, such as C8 olefin oxide or C16 olefin oxide.

A complete or partial reaction of said OH groups with monoisocyanates, for example monoadducts of diisocyanates and monoalcohols such as monohydroxy polyethers, is likewise possible.

The aforementioned reaction products of the species of formula (III) can in turn be salified and/or quaternized by the same means and in the same manner as the species of formula (III) itself. Alternatively, the OH groups in the species of general formulae (IVa) and (IVb) can also be reacted in the same way as the OH groups of the species of formula (III).

Besides the aforementioned reactions of the hydroxyl groups, formed by epoxide ring opening, with lactones, lactides, hydroxycarboxylic acids and/or monoisocyanates, analogous reactions can be effected at the group —NQR$^1$ of formula (III) when R$^1$ is hydrogen. The group —NHQ in that case reacts analogously to the hydroxyl group.

Process for the Production of the Epoxide-Amine Adducts

The epoxide-amine adducts according to the invention can be obtained by a process in which one or more primary amines (A) of general formula (I)

Q-NH$_2$ (I)

are reacted with one or more monoepoxides (B) of general formula (II)

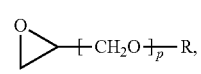
(II)

and
wherein
Q is a radical R'-[OEt]$_n$[OPr]$_m$[OBu]$_s$-, wherein
R' is a radical selected from alkyl radicals having 1 to 6 carbon atoms,
OEt is an ethylene oxide radical, OPr is a propylene oxide radical and OBu is a butylene oxide radical,
n is a number from 0 to 100, m is a number from 3 to 50 and s is a number from 0 to 20 and n+m+s=3 to 170,
R is an organic radical selected from aliphatic radicals having 4 to 24 carbon atoms, aromatic radicals having 6 to 18 carbon atoms and araliphatic radicals having 7 to 34 carbon atoms, and p is 0 or 1,
wherein
(i) the primary amine(s) (A) and the monoepoxide(s) (B) are reacted in a ratio (A):(B) of from 1:2 to 1:1.35, preferably 1:1.90 to 1:1.50, particularly preferably 1:1.85 to 1:1.70 and
(ii) at least 40 mol % of the radicals R are selected from aromatic radicals having 6 to 18 carbon atoms and araliphatic radicals having 7 to 24 carbon atoms, preferably aromatic radicals having 6 to 20 carbon atoms, particularly preferably aromatic radicals having 6 or 7 carbon atoms.

The reaction is preferably effected using catalysts. In principle, catalysts having tertiary amino groups can be used for the epoxide-amine addition. These include, in particular, tertiary amines that have low volatility or that are essentially nonvolatile, such as in particular triethylenediamine (DABCO). In many cases, however, the reaction also proceeds without catalysis.

The production is preferably effected free of solvent. However, it is also possible to use commercially available solvents that are inert to a very great extent, preferably as completely as possible, within the context of the synthesis.

The reaction is preferably conducted at a temperature of 80 bis 160° C., particularly preferably 120 to 150° C. and very particularly preferably 130 to 150° C., until essentially all of the epoxide groups in the reaction mixture have been consumed. The typical reaction time is in the range from 8 to 24 h, such as, for example, in the range from 12 to 20 h.

The primary amino group on the primary amine (A) can come to react with two epoxy groups of the monoepoxides (B), with the result that (A):(B) 1:2 adducts can form (R$^1$=CH$_2$—CH(OH)—[CH$_2$—O]$_p$—R in formula (III)). Preferably, however, an excess of the primary amine is used to ensure as complete a reaction as possible of all epoxide groups, that is, the ratio (A):(B) is preferably in the range of 1:1.90 to 1:1.50. This means that in such cases a minor amount of an (A):(B) 1:1 adduct is also formed (R$^1$=H in formula (III)).

A secondary, non-preferred side reaction may also be the addition of a monoepoxide (B) onto hydroxyl groups of the species of formula (III). The entire reaction product, including the possible by-products, is suitable as a mixture within the context of the present invention as wetting agent and dispersant.

The epoxide-amine adducts thus obtained are already usable as wetting agents and dispersants.

However, they can also be used as described above in the form of their salts and quaternization products.

For the salification and/or quaternization, the above epoxide-amine adducts are preferably dissolved in a polar solvent such as, for example, propylene glycol methyl ether acetate (Dowanol PMA) and/or monopropylene glycol monomethyl ether (Dowanol PM) together with the acid used for the salification or the quaternizing agent.

The salification is preferably effected at elevated temperature, particularly preferably at a temperature in the range from 50 to 120° C., very particularly preferably in the range from 60 to 80° C.

The reaction time is typically in the range from 30 min to 6 h, preferably 1 to 3 h.

Different methods are used for the quaternization.

The quaternization can be effected, for example, by using monoepoxides in the presence of an organic acid. Preference is given here to an equimolar ratio of the species to be quaternized with and of the organic acid used for the quaternization. Particularly suitable acids here are benzoic acid and p-toluenesulfonic acid. The reaction is typically conducted at about 120° C. for 2 to 8 h, usually 4 h.

The quaternization can, however, also be effected by way of example by using benzyl chloride, preferably 0.2 mol to 0.9 mol, based on the species to be quaternized. This reaction is likewise typically conducted at about 120° C. for 2 to 8 h, usually 4 h.

In a quaternization with, by way of example, monochloroacetic acid, it should be borne in mind that in the quaternization reaction one mole of hydrochloric acid is formed per mole of monochloroacetic acid used, this hydrochloric acid acting in turn as a salifying agent HX and binding to the nitrogen atom of the species of formula (III). This reaction is likewise typically conducted at about 120° C. for 2 to 8 h, usually 4 h.

Of course, it is also possible to combine different quaternizing agents. If quaternizing agents are used in combination and one of the quaternizing agents is monochloroacetic acid, this is preferably used in small amounts of up to 0.25 mol, particularly preferably up to 0.2 mol or up to 0.1 mol, based on one mole of the nitrogen to be quaternized in the species of formula (III). The reaction conditions correspond to those mentioned above.

Inventive Dispersions

The invention also relates to dispersions comprising a dispersion medium and also at least one type of dispersed particulate solid and at least one epoxide-amine adduct according to the invention. The solid is preferably an inorganic or organic filler, an inorganic or organic pigment or a form of carbon different from customary fillers and pigments, wherein, with the exception of the pigment blacks, the various forms of carbon are formally included herein among the fillers. There is also no precise delimitation between pigments and fillers in the literature. Frequently, however, the refractive index is used to differentiate between pigments and fillers. Usually, pigments have a refractive index of ≥1.7, whereas the refractive index of fillers is usually <1.7. However, such a sharp distinction does not play a crucial role within the context of the invention.

Based on the total weight of the dispersion, the inventive epoxide-amine adducts and/or wetting agents and dispersants are preferably used in an amount from 0.1% to 10% by weight, particularly preferably 0.3% to 4.5% by weight, and very particularly preferably 0.5% to 4% by weight.

The dispersion according to the invention is preferably selected from the group consisting of inks, printing inks, coating compositions, in particular lacquers, paints, pigment pastes, filler pastes, pigment concentrates, ceramic materials, cosmetics, casting compounds, molding compounds and especially polymer concrete compositions.

In contrast to standard concrete, so-called polymer concrete (also referred to as mineral casting) comprises one or more polymers as binder which hold the other fillers (additives), which include the aggregate in particular, together. The hydraulic binder cement that is typically used in standard concrete is used only as a filler, if at all, in polymer concrete, that is to say as an extension of the aggregate into the ultrafine-grain range, and usually does not perform any binding action. Unsaturated polyester resins (UP resins) are the most prevalent polymer matrix for polymer concrete. However, epoxy resins are also frequently used. However, due to their extremely low tendency toward shrinkage and their low viscosity, resins are also used that are based on poly(meth)acrylate, for example based on poly(methyl methacrylate).

Depending on the formulation, fillers preferably constitute at least 80% by weight to over 90% by weight, for example up to 92% or 94% by weight, based on the total weight of the polymer concrete composition. Natural and synthetic materials of varying grain size can be used, predominantly gravel of hard rock. In some cases, non-mineral additives (steel, glass), for example in fiber form, are also added as fillers. Within the context of this invention, pigments, especially those serving to impart color, are also considered to be among the fillers of a polymer concrete. Since the polymer concrete properties are determined by the properties of the fillers and by the formulation, that is to say the proportions of the fillers and the resin and any hardener present and also in some cases further additives, specific requirements are placed on the density, tensile strength and compressive strength thereof, the modulus of elasticity, the coefficient of thermal expansion and the thermal conductivity.

The size and composition of the fillers and the shapes to be produced influence each other. The greater the content of binder, the more liquid the polymer concrete becomes and the better it can be cast. In contrast to this, the mechanical properties of the polymer concrete decrease with increasing binder content. In order to achieve good compaction and homogeneity of the material, the smallest wall thicknesses must be several times the maximum filler grain size. It is likewise possible to produce a foamed polymer concrete using blowing agents. Foamed polymer concrete typically has a lower density and lower thermal conductivity.

The binder, also called matrix, consists of resin and possibly hardener and preferably constitutes 5% to 20% by weight, based on the total weight of the polymer concrete composition. The binder often also serves as a lubricant during processing. Fillers and binders should preferably be chemically inert with respect to each other.

Further constituents of a polymer concrete composition are additives such as, for example, curing catalysts and/or initiators, wetting agents and dispersants, adhesion promoters, leveling agents or defoamers. The wetting agents and dispersants influence in particular the viscosity, but also the surface quality and, in the case of colored polymer concrete products, the color intensity in the pigmented cured product, that is to say of the polymer concrete composition after the curing thereof. The epoxide-amine adducts according to the invention or the wetting agents and dispersants according to the invention are therefore used in the polymer concrete compositions according to the invention. Preferred use amounts of the epoxide-amine adducts according to the invention or of the wetting agents and dispersants according to the invention, based on the total weight of the polymer concrete compositions according to the invention, are 0.1% to 2% by weight, particularly preferably 0.1% to 1% by weight and very particularly preferably 0.1% to 0.5% by weight.

Preferred polymer concrete compositions are accordingly those comprising
- (a) at least 80% by weight of fillers,
- (b) at least 5% by weight of one or more polymers as binder, selected from the group consisting of unsaturated polyester resins, epoxy resins and poly(meth)acrylates, preferably exclusively unsaturated polyester resins, and
- (c) 0.1% to 2% by weight of one or more of the epoxide-amine adducts according to the invention or of the wetting agents and dispersants according to the invention and also
- (d) optionally further additives, preferably selected from the group of the curing catalysts, curing initiators, adhesion promoters, leveling agents and defoamers, wherein the proportions in percentages by weight are based on the total weight of the polymer concrete composition and the components add up to 100% by weight.

Particularly preferred polymer concrete compositions are those comprising
- (a) at least 80% by weight of fillers,
- (b) 5% to 15% by weight, preferably 7% to 13% by weight of one or more polymers as binder, selected from the group consisting of unsaturated polyester resins, epoxy resins and poly(meth)acrylates, preferably exclusively unsaturated polyester resins, and
- (c) 0.1% to 1% by weight of one or more of the epoxide-amine adducts according to the invention or of the wetting agents and dispersants according to the invention and also
- (d) 0.1% to 3% by weight of further additives, preferably selected from the group of the curing catalysts, curing initiators, adhesion promoters, leveling agents and defoamers, wherein the proportions in percentages by weight are based on the total weight of the polymer concrete composition and the components add up to 100% by weight.

In principle, the polymer concrete compositions can also be combined with water and cement, as is the case, for example, with polymer cement concrete (PCC).

Use of the Epoxide-Amine Adducts as Wetting Agents and Dispersants

Lastly, the invention also relates to the use of the epoxide-amine adduct according to the invention as a wetting agent and dispersant and also wetting agents and dispersants comprising or consisting of the epoxide-amine adducts according to the invention.

The epoxide-amine adduct according to the invention is used in particular in the fields of use known for dispersants. By way of example, in the production or processing of lacquers, printing inks, paper coating, leather and textile dyes, pastes, pigment concentrates, ceramic materials or cosmetic preparations, and especially when these products contain particulate solids such as pigments and/or fillers.

It is also possible to use the epoxide-amine adduct according to the invention in the production or processing of casting and/or molding compounds based on synthetic, semisynthetic or natural macromolecular substances, such as polyvinyl chloride, saturated or unsaturated polyesters, polyurethanes, polystyrenes, polyacrylates, polyamides, epoxy resins, polyolefins such as polyethylene or polypropylene. By way of example, it is possible to use appropriate epoxide-amine adducts for the production of SMC/BMC compositions, casting compounds, polymer concrete based on unsaturated polyester resins, PVC plastisols, gelcoats, printed circuit boards, industrial varnishes, wood and furniture varnishes, vehicle paints, marine paints, anticorrosion paints, can and coil coatings and decorating and architectural paints. Examples of customary main binders in such systems are resins based on polyurethanes, cellulose nitrates, cellulose acetobutyrates, alkyd resins, melamine resins, polyesters, chlorinated rubbers, epoxy resins and acrylate resins. Examples of water-based coatings are cathodic or anodic electrocoats, for example for automobile bodywork. Further examples are plasters, silicate paints, emulsion paints, water-based varnishes based on water-thinnable alkyd resins, alkyd emulsions, hybrid systems, 2-component systems, polyurethane dispersions and acrylate dispersions.

The epoxide-amine adducts according to the invention are especially also suitable as dispersants for the production of solids concentrates such as pigment concentrates. For this purpose, by way of example, the epoxide-amine adducts are initially charged in a carrier medium, such as organic solvents, optionally plasticizers and/or water, and the solids to be dispersed are added while stirring. In addition, these concentrates may comprise binders and/or other auxiliaries. However, it is in particular possible to use the epoxide-amine adducts to produce stable binder-free pigment concentrates. It is likewise possible to use the epoxide-amine adducts according to the invention to produce free-flowing solids concentrates from pigment presscakes. This is done by mixing the epoxide-amine adducts into the presscake, which may still contain organic solvents, plasticizers and/or water, and dispersing the mixture thus obtained. The solids concentrates produced in various ways can then be incorporated into different substrates, for example alkyd resins, polyester resins, acrylate resins, polyurethane resins or epoxy resins.

However, particulate solids, but especially pigments and/or fillers, can also be dispersed in a solvent-free manner directly in the epoxide-amine adducts and are then particularly suitable for pigmentation of thermoplastic and thermoset plastics formulations.

The invention therefore also relates to a particle formulation comprising 5.0% to 99.9% by weight of one or more particulate solids and also 0.1% to 95.0% by weight of one or more epoxide-amine adducts according to the invention or wetting agents and dispersants according to the invention, based on the total weight of the particle formulation. The particle formulations are preferably pigment formulations or pigment/filler formulations, also referred to as pigment preparations or pigment/filler preparations. The particulate solids, in particular the pigments and/or fillers, are typically present at a higher concentration in the aforementioned formulations or preparations than in the later applications. In the simplest case, the epoxide-amine adduct according to the invention can serve as a carrier material for the particulate solids, so that in such a case the preparations consist of 5.0% to 99.9% by weight of one or more particulate solids and also 0.1% to 95.0% by weight of one or more epoxide-amine adducts according to the invention.

However, the particle formulations may also contain binders different from the wetting agent and dispersant, including other additives and/or organic solvents and/or water. The particle formulations can be present in solid form, for example as powder, chips or granules, or in liquid form.

In the case of liquid pigment preparations or pigment/filler preparations, depending on the pigment content or pigment and filler content, these are also referred to as color concentrates, pigment pastes, full tone pastes, shading or tinting pastes or pigment doughs.

The particle formulations according to the invention, in particular the pigment formulations or pigment/filler formulations, are preferably used in the production of lacquers, printing inks and plastics.

The epoxide-amine adducts can advantageously also be used in the production of inks for "non-impact" printing methods such as thermal inkjet and the bubblejet method. These inks may for example be aqueous ink formulations, solvent-based ink formulations, solvent-free or low-solvent inks for UV applications, or else wax-type inks.

The epoxide-amine adducts can advantageously also be used in the production of color filters for liquid-crystal displays, liquid-crystal screens, color resolution devices, sensors, plasma screens, displays based on SED (urface conduction Electron emitter Display) and for MLCCs (Multi Layer Ceramic Capacitors). Here, the liquid color filter paint, also called a color resist, can be applied by a very wide variety of application methods, such as spin coating, knife coating, a combination of the two methods or via "non-impact" printing methods such as for example inkjet methods. MLCC technology is used in the production of microchips and printed circuit boards.

The epoxide-amine adducts can also be used for the production of cosmetic preparations, such as, for example, makeup, face powders, lipsticks, hair dyes, creams, nail varnishes and sunscreen preparations. These may be in the customary forms, such as for example in the form of W/O or O/W emulsions (water-in-oil or oil-in-water emulsions), solutions, gels, creams, lotions or sprays. The epoxide-amine adducts can be used advantageously in dispersions used to produce these preparations. These may comprise the carrier media that are customary for these purposes in cosmetics, such as water, castor oils or silicone oils, and solids, for example organic and inorganic pigments, such as titanium dioxide or iron oxide.

Lastly, such a dispersant can also be used for the production of a pigmented coating on a substrate, wherein a pigmented coating compound is applied to the substrate and wherein the pigmented coating composition that has been applied to the substrate is baked or otherwise cured/cross-linked.

The epoxide-amine adducts can be used alone or together with customary binders. When used in polyolefins, it may for example be advantageous to use appropriate low-molecular-weight polyolefins as carrier materials together with the epoxide-amine adduct according to the invention.

One possible use of the epoxide-amine adducts according to the invention is also in the production of dispersible solids in the form of powder particles and/or fiber particles, in particular of dispersible pigments or fillers, especially plastics fillers, wherein the particles have been coated with the epoxide-amine adduct according to the invention. Such coating operations of organic and also inorganic solids are carried out in a known manner. Here, the solvent or emulsifying agent can either be removed or remain in the mixture to form pastes. These pastes are standard commercial products and may additionally contain proportions of binders and also further auxiliaries and additives. Specifically in the case of pigments, the coating of the pigment surface can take place during or after the synthesis of the pigments, for example by addition of the epoxide-amine adducts to the pigment suspension, or during or after the pigment finishing.

The pigments pretreated in this manner, compared to untreated pigments, feature easier incorporability and also improved viscosity, flocculation and gloss properties and greater color intensity.

Examples of inorganic pigments that are suitable within the context of the present invention are oxide pigments and oxide hydroxide pigments and also complex inorganic pigments, such as for example titanium dioxide pigments, iron oxide pigments, chromium oxide pigments, bismuth vanadate pigments, complex inorganic chromatic pigments, for example with rutile or spinel lattice, or oxidic ceramic colored pigments; sulfide pigments and sulfide selenide pigments, such as for example zinc sulfide pigments, and cadmium pigments; lead chromate pigments, such as for example chrome yellow pigments, molybdate red pigments and chrome green and true chrome green pigments; complex salt pigments, such as for example cyanide pigments (iron blue); silicate pigments, such as for example ultramarine pigments; effect pigments, such as for example platelet-type aluminum pigments, gold bronze pigments and zinc pigments, pearlescent pigments, effect pigments based on iron oxide, metal-based effect pigments, color-variable pigments and cholesteric effect pigments; anticorrosion pigments, such as for example zinc dust, phosphate pigments, zinc oxide/zinc white, iron mica and anticorrosion pigments based on titanium dioxide; and pigment blacks, such as for example furnace blacks, gas blacks and thermal blacks.

Examples of organic pigments that are suitable within the context of the present invention are azo pigments, such as for example monoazo pigments, diazo pigments, polyazo pigments and metal complex pigments; polycylic pigments, such as for example copper phthalocyanines, diketopyrrolopyrroles (DPP), quinacridones, isoindolinones, isoindolines, perylenes and perinones; fluorescent and phosphorescent pigments; and organic black pigments.

Examples of fillers that are suitable within the context of the present invention are silicates, such as for example natural silicas, for example quartz, cristobalite and translucent fused quartz, kieselguhr, talc, kaolin, mica, feldspar and nepheline syenite, Plastorit, perlites, asbestos, hornblende, wollastonite and siliceous earth; synthetic silicas and silicates, such as for example fumed silicon dioxide, precipitated silicas, sodium aluminum silicates, calcium silicates, silicas in platelet form, hydrothermal silicas, sheet silicates, silica gels, aerogels, silica sols, for example hydrosols and organosol, and glass; carbonates as fillers, such as for example natural calcium carbonate products, precipitated calcium carbonate, dolomite, barium carbonate and magnesium carbonate; sulfates, such as for example barium sulfate, drilling baryte, chemical baryte, filler baryte and blanc fixe, calcium sulfate; aluminum oxide and aluminum hydroxide; silicon carbide, fluorspar, slate powder and graphite.

Examples of forms of carbon that are suitable within the context of the present invention, insofar as they have not already been listed under the term pigments or fillers, are by way of example amorphous carbon, carbon fibers, glassy carbon, graphene, fullerene, diamond, lonsdaleite, activated carbon, carbon nanotubes, carbon nanobuds, carbon nanofoam and aerographite.

Further examples of pigments and fillers can be found, for example, in the "*Lehrbuch der Lacke and Beschichtungen* [Textbook of paints and coatings]" by Kittel, vol. 5, from S. Hirzel Verlag, 2003, 2nd edition, "*Pigmente, Füllstoffe, Farbmetrik [Pigments, fillers, colorimetry]*".

Furthermore, the epoxide-amine adduct according to the invention can also be used as an emulsifier and phase mediator (liquid/liquid compatibilizer).

The invention is to be explained in more detail hereinafter on the basis of exemplary embodiments.

EXAMPLES

Measurement Methods
Amine Number

The amine number (AN) is understood to mean the amount of KOH in mg corresponding to the amine content of 1 g of substance. The amine number is determined according to DIN 16945 by a neutralization reaction with 0.1 N perchloric acid in acetic acid as titrant.

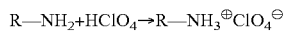

Additions of inert solvents, such as cyclohexane, dioxane, chlorobenzene, acetone, methyl ethyl ketone, can improve the titration of very weak bases.

Epoxy Equivalent

The epoxide equivalent weight is understood to mean that amount of epoxy resin in g that contains 16 g of epoxidically bonded oxygen (epoxide oxygen).

The epoxide groups in epoxy resins can be determined by addition of HBr onto the epoxide ring. The equivalent amount of HBr is liberated by titration with $HClO_4$ in the presence of cetyltrimethylammonium bromide (N,N,N-trimethyl-1-hexadecanaminium bromide; CTABr).

Since the amine is also simultaneously protonated in the titration with perchloric acid, this amount of perchloric acid has to be subtracted in order to calculate the epoxy equivalent. It is therefore necessary to determine the amine number prior to determination of the epoxy equivalent.

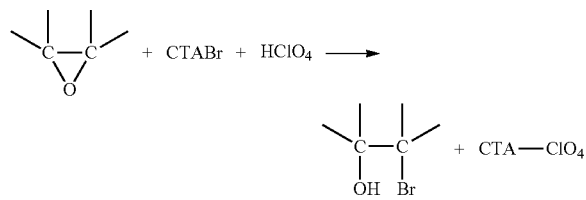

Epoxide equivalent=initial weight (gr.)*1000/(consumption (ml)*n*f)–(amine number/56.1)

n=normality of the titrant
f=factor of the titrant

Acid Number

The acid number is determined according to DIN EN ISO 2114 by a neutralization reaction with 0.1 N KOH in ethanol as titrant.

Comparative Examples

All non-inventive adducts and the pastes, lacquers and polymer concretes produced using said adducts are designated herein with a "*".

Epoxide-Amine Adduct EA1*

82 g of Epikote 828 (0.07 mol; undiluted difunctional bisphenol A-epichlorohydrin reaction product, manufacturer Momentive) are reacted with 528 g of Jeffamine M 2070 (0.085 mol; methanol-started polyether monoamine with terminal primary amino group, approximately 10 OPr and 31 OEt units; amine number=27 mg KOH/g; manufacturer Huntsman) at 140° C. for 27 h.

Amine number: 19.6 mg KOH/g
Epoxy equivalent: infinite

Epoxide-Amine Adduct EA2*

82 g of Epikote 828 (0.22 mol) are reacted with 359 g of Jeffamine M 2070 (0.177 mol) and 8.6 g of dimethylaminopropylamine (0.08 mol) at 140° C. for 7 h. Subsequently, 145 g of a polyether-tolylene diisocyanate adduct (preparation see below) are added and allowed to react at 65° C. for a further 5 h.

Amine number: 21.7 mg KOH/g
Epoxy equivalent: infinite
Isocyanate content: 0.05%

Inventive Examples

Epoxide-Amine Adduct EA3

Cresyl glycidyl ether (1.042 mol) was reacted with Jeffamine M2070 (0.573 mol, 10% excess NH) at 140° C. for 16 h.

Amine number: 23.99 mg KOH/g
Epoxy equivalent: infinite

Epoxide-Amine Adduct EA4

Cresyl glycidyl ether (1.042 mol) was reacted with Jeffamine M2005 (0.573 mol, 10% excess NH) at 140° C. for 16 h.

Amine number: 22.54 mg KOH/g
Epoxy equivalent: infinite

Epoxide-Amine Adduct EA5

Cresyl glycidyl ether (1.042 mol) was reacted with Surfonamine L200 (0.546 mol, 5% excess NH) at 140° C. for 16 h.

Amine number: 24 mg KOH/g
Epoxy equivalent: infinite

Epoxide-Amine Adduct EA6

Cresyl glycidyl ether (2.83 mol) was reacted with 1462.30 g of Surfonamine L 100 (1.486 mol, 5% excess NH) at 140° C. for 16 h.

Amine number: 60 mg KOH/g
Epoxy equivalent: infinite

Epoxide-Amine Adduct EA7

Cresyl glycidyl ether (0.75 mol) and Grilonit RV1814 (0.762 mol) were reacted with Jeffamine M2070 (0.83 mol, 10% excess NH) at 140° C. for 16 h.

Amine number: 22.9 mg KOH/g
Epoxy equivalent: infinite

Epoxide-Amine Adduct EA8

Vikolox 16 (0.49 mol, C16 alpha-olefin oxide from Arkema) and cresyl glycidyl ether (0.75 mol) were reacted with Jeffamine M2070 (0.68 mol) at 140° C. for 16 h.

Amine number: 22.9 mg KOH/g
Epoxy equivalent: infinite

Epoxide-Amine Adduct EA9 (Salification)

49 g of EA8 (0.02 mol) is reacted with 2.35 g (0.02 mol) of benzoic acid in 8 g of Dowanol PMA at 50° C. for 1 h.

Amine number: 19.2 mg KOH/g
Acid number: 18.6 mg KOH/g
SC: 80%

Epoxide-Amine Adduct EA10 (Quaternization of the Salified Adduct EA9)

29.2 g of EA9 (0.01 mol) is reacted with 1.67 g (0.01 mol) of cresyl glycidyl ether in 0.42 g of Dowanol PMA at 120° C. for 4 h.

Amine number: 18.4 mg KOH/g
Acid number: 17.0 mg KOH/g
SC: 80%

Epoxide-Amine Adduct EA11

1000 g of EA8 (0.41 mol) is reacted with 46.8 g of benzyl chloride (0.37 mol) in 355 g of Dowanol PM and 355 g of Dowanol PMA at 120° C. for 4 h.

Amine number: 2.0 mg KOH/g, residual content of benzyl chloride<500 ppm (determined via HPLC)

SC: 60%

Non-Inventive Comparative Example 1*

The comparative example was produced in accordance with the instructions for polymer 4 of the international publication WO 2016059066 A1.

Performance Testing

Use of the polymers according to the invention as wetting agents and dispersants for production of pigment concentrates and use thereof in paint systems.

Starting Materials

| | |
|---|---|
| Gloss Enamel 275 | Lacryl-PU gloss enamel, water-based acrylic paint, PU-reinforced, manufacturer: Brillux |
| Heliogen Blue D 7086 | blue pigment, color index PB 15:3, manufacturer: BASF |
| Heliogen Green L 8730 | green pigment, color index PG 7, manufacturer: BASF |
| Permanent Orange RL 70 | orange pigment, color index PO 34, manufacturer: Clariant |
| Hostaperm Blue A2R | blue pigment, color index PB 15:0, manufacturer: Clariant |
| Rocima 512 | biocide mixture of chloromethyl-/methylisothiazolone, octylisothiazolone and bronopol, manufacturer: Dow Chemical |
| Preventol P 91 MV | biocide mixture of isothiazolones and bronopol, manufacturer: Lanxess |
| Polyglykol P 400 | polyglycol of molar mass approximately 400 g/mol, manufacturer: Clariant |
| Arkopal N 100 | nonylphenol ethoxylate, manufacturer: Clariant |
| Lansurf CO12 | castor oil ethoxylate, manufacturer: Lankem |
| MAKON® TSP 25 | polyarylphenyl ethoxylate, manufacturer: Stepan |
| Algene WF | alkylamine ethoxylate, manufacturer: Huntsman |

The Production of Pigment Pastes and Coating Formulations

The pigment pastes PP were produced according to the formulations in tables 1 to 4 below. The wetting and dispersing additive, or Algene WF, Arkopal N100, Lansurf CO12 and MAKON TSP-25 (in the case of the reference pigment pastes), PEG 400, demineralized water and Preventol P91 MV weighed in this order into a beaker and homogenized by hand using a spatula. Subsequently, the respective amount of pigment was incorporated a little at a time using a toothed disk in a Dispermat at around 500 rpm (1.5 m/s). Next, the batches were homogenized in the Dispermat for 10 minutes at 3000 rpm (9 m/s). Thereafter, the pH was adjusted with sulfuric acid, the batch was completed with Rocima 521 and the batch was transferred into a bead mill. The batch was then milled in the bead mill for one hour at 2800±50 rpm using SAZ-120-S beads (0.6-0.8 mm).

TABLE 1

| Pigment PB 15:3 | PP1a* | PP1b* | PP1e* | PP1f* | PP1c | PP1d |
|---|---|---|---|---|---|---|
| Algene WF | 9.4 | | | | | |
| Arkopal N 100 | 4.7 | | | | | |
| Comparative example 1* | | 14.1 | | | | |
| EA1* | | | 14.1 | | | |
| EA2* | | | | 14.1 | | |
| EA6 | | | | | 14.1 | |
| EA3 | | | | | | 14.1 |
| Polyglykol P 400 | 7.3 | 7.3 | 7.3 | 7.3 | 7.3 | 7.3 |
| Demineralized water | 32.5 | 32.5 | 32.5 | 32.5 | 32.5 | 32.5 |
| Preventol P 91 MV | 0.14 | 0.14 | 0.14 | 0.14 | 0.14 | 0.14 |
| Heliogen Blue D 7086 15:3 | 45.0 | 45.0 | 45.0 | 45.0 | 45.0 | 45.0 |
| H$_2$SO$_4$, 25% | 0.64 | 0.64 | 0.64 | 0.64 | 0.64 | 0.64 |
| Rocima 521 | 0.3 | 0.3 | 0.3 | 0.3 | 0.3 | 0.3 |
| Sum total of the parts by weight | 100.0 | 100.0 | 100.0 | 100.0 | 100.0 | 100.0 |

TABLE 2

| Pigment PB 15:0 | PP2a* | PP2b* | PP2c | PP2d |
|---|---|---|---|---|
| Algene WF | 11.00 | | | |
| Lansurf CO12 | 7.90 | | | |
| Comparative example 1* | | 18.90 | | |
| EA6 | | | 18.90 | |
| EA3 | | | | 18.90 |
| Polyglykol P 400 | 6.00 | 6.00 | 6.00 | 6.00 |
| Demineralized water | 31.30 | 31.30 | 31.30 | 31.30 |
| Preventol P 91 MV | 0.14 | 0.14 | 0.14 | 0.14 |
| Hostaperm Blue A2R 15:0 | 43.0 | 43.0 | 43.0 | 43.0 |
| H$_2$SO$_4$, 25% | 0.38 | 0.38 | 0.38 | 0.38 |
| Rocima 521 | 0.30 | 0.30 | 0.30 | 0.30 |
| Sum total of the parts by weight | 100.0 | 100.0 | 100.0 | 100.0 |

TABLE 3

| Pigment PG 7 | PP3a* | PP3d* | PP3e* | PP3b* | PP3c |
|---|---|---|---|---|---|
| Algene WF | 9.0 | | | | |
| Arkopal N 100 | 4.5 | | | | |
| Comparative example 1* | | | | 13.5 | |
| EA1* | | 13.5 | | | |
| EA2* | | | 13.5 | | |
| EA6 | | | | | 13.5 |
| Polyglykol P 400 | 6.5 | 6.5 | 6.5 | 6.5 | 6.5 |
| Demineralized water | 30.8 | 30.8 | 30.8 | 30.8 | 30.8 |
| Preventol P 91 MV | 0.14 | 0.14 | 0.14 | 0.14 | 0.14 |
| Heliogen Green L 8730 | 48.0 | 48.0 | 48.0 | 48.0 | 48.0 |
| H$_2$SO$_4$, 25% | 0.76 | 0.76 | 0.76 | 0.76 | 0.76 |
| Rocima 521 | 0.30 | 0.30 | 0.30 | 0.30 | 0.30 |
| Sum total of the parts by weight | 100.0 | 100.0 | 100.0 | 100.0 | 100.0 |

TABLE 4

| Pigment PO 34 | PP4a* | PP4b | PP4c |
|---|---|---|---|
| Algene WF | 10.0 | | |
| MAKON TSP-25 | 5.5 | | |
| EA3 | | 15.50 | |
| EA11 | | | 15.50 |
| Polyglykol P 400 | 5.0 | 5.0 | 5.0 |
| Demineralized water | 40.97 | 40.97 | 40.97 |
| Preventol P 91 MV | 0.14 | 0.14 | 0.14 |
| Permanent Orange RL 70 | 37.5 | 37.5 | 37.5 |

TABLE 4-continued

| Pigment PO 34 | PP4a* | PP4b | PP4c |
|---|---|---|---|
| H$_2$SO$_4$, 25% | 0.59 | 0.59 | 0.59 |
| Rocima 521 | 0.30 | 0.30 | 0.30 |
| Sum total of the parts by weight | 100.0 | 100.0 | 100.0 |

It was not possible to obtain a further-processable formulation of the pastes with the dispersant of non-inventive comparative example 1* (pigment pastes: PP1b*, PP1e*, PP1f* PP2b* and PP3b*, PP3d*, PP3e*), since in these cases either a strong thickening of the paste occurred after grinding, or gel particles could be seen.

The pigment pastes obtained, which were in a processable range in terms of their viscosity, were mixed in a ratio of 3 parts by weight of pigment paste to 97 parts by weight of Brillux Gloss Enamel 275 (white, base 40). The pastes were stirred with the spatula and then homogenized for 3 minutes using the Skandex shaker (the compositions of the coating formulations can be seen in table 5). The lacquer was applied to a contrast chart using a 150 μm bar applicator and rubbed out at one location. The lacquer films were flashed off at 23° C. for 5 to 10 minutes. The rub-out test was performed immediately afterwards. The films were then cured for 24 h at 23° C. before the ΔL, Δa, Δb and ΔE values were determined.

TABLE 5

| Coating formulation | Parts by weight/Brillux Gloss Enamel 275 (white base 40) | Parts by weight/pigment paste |
|---|---|---|
| F1a* | 97 | 3/PP1a* |
| F1c | 97 | 3/PP1c |
| F1d | 97 | 3/PP1d |
| F2a* | 97 | 3/PP2a* |
| F2c | 97 | 3/PP2c |
| F2d | 97 | 3/PP2d |
| F3a | 97 | 3/PP3a |
| F3c | 97 | 3/PP3c |
| F4a* | 97 | 3/PP4a* |
| F4b | 97 | 3/PP4b |
| F4c | 97 | 3/PP4c |

The color intensity and the L, a, b and ΔE values were measured with a Color Sphere Gloss instrument (available from BYK Gardner), in each case on the white area of the contrast chart. The color intensity was measured in % and the ΔL, Δa, Δb and ΔE values were measured relative to the respective reference formulation containing wetting and dispersing additives from the prior art. In addition, the ΔL, Δa, Δb and ΔE values of the rub-out were measured in comparison with the unloaded area.

The measurement results for the individual coating formulations can be gathered from tables 6 to 9.

TABLE 6

| Coating formulation | F1a* | F1c | F1d |
|---|---|---|---|
| Color intensity versus F1a* | 100 | 106.8 | 104.8 |
| Color versus F1a* | | | |
| ΔL | 0 | 1.76 | −0.29 |
| Δa | 0 | −1.35 | −0.68 |
| Δb | 0 | −1.54 | −0.77 |
| ΔE | 0 | 2.70 | 1.06 |

TABLE 6-continued

| Coating formulation | F1a* | F1c | F1d |
|---|---|---|---|
| Rub-out | | | |
| ΔL | 1.84 | 0.23 | 0.11 |
| Δa | −1.26 | 0.02 | 0.01 |
| Δb | −1.92 | −0.08 | −0.09 |
| ΔE | 2.94 | 0.24 | 0.14 |

TABLE 7

| Coating formulation | F2a* | F2c | F2d |
|---|---|---|---|
| Color intensity versus F2a* | 100 | 103.5 | 102.00 |
| Color versus F2a* | | | |
| ΔL | 0 | −0.22 | −0.19 |
| Δa | 0 | −0.57 | −0.08 |
| Δb | 0 | −0.73 | −0.37 |
| ΔE | 0 | 0.94 | 0.42 |
| Rub-out | | | |
| ΔL | −0.74 | 0.55 | −0.15 |
| Δa | 0.22 | −0.03 | −0.01 |
| Δb | −1.04 | −0.01 | −0.13 |
| ΔE | 1.29 | 0.55 | 0.19 |

TABLE 8

| Coating formulation | F3a* | F3c |
|---|---|---|
| Mixed into Gloss Enamel 275, base 40 | | |
| Color intensity versus F3a* | 100 | 101.9 |
| Color versus F3a* | | |
| ΔL | 0 | 0.01 |
| Δa | 0 | −0.05 |
| Δb | 0 | −0.09 |
| ΔE | 0 | 0.50 |
| Rub-out | | |
| ΔL | 2.54 | 0.53 |
| Δa | −1.87 | −0.26 |
| Δb | −0.19 | −0.07 |
| ΔE | 3.15 | 0.59 |

TABLE 9

| Coating formulation | F4a* | F4b | F4c |
|---|---|---|---|
| Color intensity versus F4a* | 100 | 103.8 | 104.1 |
| Color versus F4a* | | | |
| ΔL | 0 | 2.05 | 0.99 |
| Δa | 0 | 1.80 | 1.41 |
| Δb | 0 | 2.48 | 2.22 |
| ΔE | 0 | 3.86 | 2.81 |
| Rub-out | | | |
| ΔL | 2.39 | 0.26 | 0.10 |
| Δa | 0.61 | −0.47 | −0.29 |
| Δb | 1.14 | −0.25 | −0.51 |
| ΔE | 2.71 | 0.59 | 0.59 |

In summary, for the use of the inventive epoxide-amine adducts in pigment concentrates, it can be stated that significantly higher color intensities have been achieved than with wetting and dispersing additives of the prior art. In the formulations F1c, F1d, F2c and F2d, by the use of the inventive additives, the blue shades were shifted as desired to a deeper blue compared to the formulations F1a* and F2a*, respectively, (−b component). The green formulation F3c appears significantly greener (−a component) than the corresponding reference formulation F3a* and the orange-colored formulations F4b and F4c show a significantly stronger red and yellow component (+a and +b components) by way of the use of the inventive epoxide-amine adducts in comparison to formulation F4a*. The inventive additives stabilize the color pastes very well and achieve significantly better □E values in the rub-out.

Production and Testing of Polymer Concrete Compositions

| Raw materials | |
|---|---|
| Palatal P4-01 | unsaturated polyester resin based on o-phthalic acid and glycols dissolved in styrene, manufacturer: Aliancys |
| BYK-C 8000 | reactive polymeric coupling agent, manufacturer: BYK |
| Akzo NL-51P | Co(II) 2-ethylhexanoate, accelerator for unsaturated polyester resins, manufacturer: Akzo Nobel |
| Dorsilit 7 | crystalline quartz sand of grain size 0.6 to 1.2 mm, manufacturer: Dorfner |
| Dorsilit 8 | crystalline quartz sand of grain size 0.3 to 0.8 mm, manufacturer: Dorfner |
| Millisil W 10 | quartz flour, manufacturer: Quarzwerke |
| Hostaperm Red E3B | quinacridone red pigment, manufacturer: Clariant |
| Trigonox C | tert-butyl peroxybenzoate, free-radical initiator, manufacturer: Akzo Nobel |

1. Production of Filled, Unsaturated Polyester Resins (UP) for the Purpose of Determining the Reduction in Viscosity The UP resin and the additive were initially charged in a beaker having an 80 mm diameter and stirred by hand with a spatula. The filler Millisil W10 was then weighed in and likewise stirred in with a spatula. Thereafter, this compound was dispersed under the following conditions: 1 min by means of a dissolver (40 mm dissolver disk, circumferential speed 1.95 m/s (930 rpm)), and a further 2 min by means of a dissolver (40 mm dissolver disk, circumferential speed 3.9 m/s (1865 rpm)). The corresponding formulations are given in table 10.

After dispersing, the sample was filled into an aluminum cup and stored in a water bath for 30 minutes at 30° C. The viscosity in pascal seconds was determined at 30° C. using a Brookfield DV II+ rotational viscometer (spindle 6, shear rate 20 rpm). The viscosities and also the percentage reductions in viscosity compared to UP1* are given in table 10.

This test is a preliminary test in the context of polymer concrete production. It was used to determine the influence of additives on the viscosity reduction. For this purpose, neither a coupling agent (BYK C 8000) nor a catalyst was initially used. Furthermore, the addition of coarse silicates was dispensed with in order to perform the viscosity measurements.

2. Production of the Polymer Concrete Compositions

The UP resin (Palatal P4-01), coupling agent (adhesion promoter) (BYK C 8000), a co-accelerator (Akzo NL-51P) and free-radical initiator (Trigonox C) were initially charged in a beaker. The quantities are shown in table 11. Subsequently, wetting and dispersing additive and pigment were added and stirred by hand. Thereafter, the quartz mix and the quartz flour were added and stirred by hand. The compound was then homogenized for 10 seconds at 1650 rpm in a Speed Mixer DAC 400.1 FVZ.

3. Production of Polymer Concrete Tiles (PCT)

A square metal spacer frame (approximately 6 mm thick, 20 cm edge length) is lined with a PE film and the sample of the polymer concrete composition is spread in the metal spacer frame. The filled metal spacer frame is covered with a PE film prior to pressing in order to avoid contamination of the press. Subsequently, the specimen thus produced is pressed using a Polystat 200T press for 5 minutes at 50 bar (approximately 250 N/cm$^2$) and 90° C. The pressed composition is then removed from the spacer frame and placed on a glass plate that has been pretreated with a release wax. The final curing of the polymer concrete tile is effected in an air circulation drying cabinet at 80° C. for 1 hour. The polymer concrete compositions are given in table 11.

The cured polymer concrete tiles are subsequently assessed with respect to their surface properties according to a school-grade system from 1 to 6. In this case, 1 stands for a smooth, compacted surface without deep holes and with good leveling. Such samples have desired properties such as high strength, few air inclusions and high-quality appearance. 6 stands for a rough surface that has a very inhomogeneous, porous appearance and indicates a poor compaction. Such samples exhibit lower strength, have deep defects or crumble. The ratings are given in table 11. When using inventive epoxide-amine adducts (EA3, EA4 and EA7), it was possible to detect a greatly improved surface quality.

TABLE 10

| Formulation | UP1* | UP2* | UP3* | UP4 | UP5 | UP6 |
|---|---|---|---|---|---|---|
| Palatal P4-01 | 30.00 | 29.30 | 29.30 | 29.30 | 29.30 | 29.30 |
| BYK-W 908 | — | 0.70 | — | — | — | — |
| BYK-W 909 | — | — | 0.70 | — | — | — |
| EA3 | — | — | — | 0.70 | — | — |
| EA4 | — | — | — | — | 0.70 | — |
| EA7 | — | — | — | — | — | 0.70 |
| Millisil W 10 | 70.00 | 70.00 | 70.00 | 70.00 | 70.00 | 70.00 |
| Sum total of the parts by weight | 100.00 | 100.00 | 100.00 | 100.00 | 100.00 | 100.00 |
| Viscosity [Pa · s] | 80.8 | 51.8 | 58.4 | 37.6 | 46.0 | 36.2 |
| Reduction of viscosity [%] | | 35.9 | 27.7 | 53.5 | 43.1 | 55.2 |

1% additive based on filler

The inventive formulations UP4, UP5 and UP6, which contain the epoxide-amine adducts according to the invention, are able to lower the viscosity of the formulation much more significantly compared to conventional wetting agents and dispersants of the prior art. This is particularly pronounced in the case of formulations UP4 and UP6, which make use of EA3 and EA7. In EA3 and EA7, n > m (EtO:PrO = 31:10), whereas for EA4 m > n (EtO:PrO = 6:29).

TABLE 11

| Formulation | PCT1* | PCT2* | PCT3* | PCT4 | PCT5 | PCT6 |
|---|---|---|---|---|---|---|
| Palatal P4-01 | 19.00 | 18.43 | 18.43 | 18.43 | 18.43 | 18.43 |
| BYK-C 8000 | 0.19 | 0.19 | 0.19 | 0.19 | 0.19 | 0.19 |
| Akzo NL-51P | 0.04 | 0.04 | 0.04 | 0.04 | 0.04 | 0.04 |
| Trigonox C | 0.38 | 0.38 | 0.38 | 0.38 | 0.38 | 0.38 |
| BYK-W 908 | — | 0.57 | — | — | — | — |
| BYK-W 909 | — | — | 0.57 | — | — | — |
| EA3 | — | — | — | 0.57 | — | — |
| EA4 | — | — | — | — | 0.57 | — |
| EA7 | — | — | — | — | — | 0.57 |
| Hostaperm Red E3B | 2.09 | 2.09 | 2.09 | 2.09 | 2.09 | 2.09 |
| Dorsilit 7/Dorsilit 8(1:1) | 122.00 | 122.00 | 122.00 | 122.00 | 122.00 | 122.00 |
| Millisil W 10 | 59.00 | 59.00 | 59.00 | 59.00 | 59.00 | 59.00 |
| Surface quality | 6 | 4 | 3 | 1 | 2 | 1 |

The inventive formulations PCT4, PCT5 and PCT6, which contain the epoxide-amine adducts according to the invention, provide an outstanding surface quality compared to conventional wetting agents and dispersants of the prior art. This is particularly pronounced in the case of formulations PCT4 and PCT6, which make use of EA3 and EA7. In EA3 and EA7, n > m (EtO:PrO = 31:10), whereas for EA4 m > n (EtO:PrO = 6:29).

The invention claimed is:

1. A dispersion, the dispersion being an ink or a coating composition and comprising a dispersion medium, at least one kind of a dispersed pigment and at least one epoxide-amine product obtained by reaction of one or more primary amines (A) of general formula (I)

  (I)

with one or more monoepoxides (B) of general formula (II)

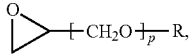  (II)

wherein
Q is a radical $R'\text{-}[OEt]_n[OPr]_m[OBu]_s\text{-}$, in which
R' is a radical selected from alkyl radicals having 1 to 6 carbon atoms,
OEt is an ethylene oxide radical, OPr is a propylene oxide radical and OBu is a butylene oxide radical,
n is a number from 5 to 75, m is a number from 3 to 40, s is a number from 0 to 10, and n+m+s=8 to 125,
R is an organic radical selected from aliphatic radicals having 4 to 24 carbon atoms, aromatic radicals having 7 to 18 carbon atoms and araliphatic radicals having 7 to 34 carbon atoms, and p is 0 or 1,
wherein
(i) the one or more primary amines (A) and the one or more monoepoxides (B) are reacted in an equivalents ratio (A):(B) of from 1:2 to 1:1.35; and
(ii) at least 40 mol % of the radicals R are selected from aromatic radicals having 7 to 18 carbon atoms and araliphatic radicals having 7 to 24 carbon atoms.

2. The dispersion as claimed in claim 1, wherein the at least one epoxide-amine product comprises one or more species of general formula (III)

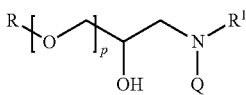  (III)

as reaction product of (A) and (B),
wherein
Q is defined in formula (I),
R and p are defined in formula (II), and
$R^1$ is H or a radical $CH_2\text{—}CH(OH)\text{—}[CH_2\text{—}O]_{p'}\text{—}R$, with the proviso that at least 33 mol % of the radicals $R^1$ is $CH_2\text{—}CH(OH)\text{—}[CH_2\text{—}O]_{p'}\text{—}R$, in which p'=0 or 1.

3. The dispersion as claimed in claim 2, wherein the one or more species of general formula (III) are present in the reaction product of (A) and (B) in an amount of at least 50% by weight, based on the weight of the reaction product of (A) and (B).

4. The dispersion as claimed in claim 2, wherein the one or more species of general formula (III) are at least partially converted by salification into one or more species of general formula (Na)

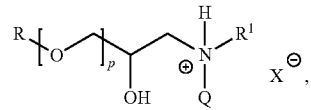  (IVa)

wherein
Q is defined in formula (I),
R and p are defined in formula (II),
$R^1$ is defined in formula (III), and
$X^\ominus$ is an acid anion
and/or
are fully or partially converted by quaternization into one or more species of formula (IVb)

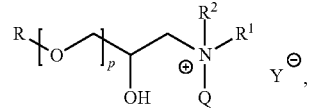  (IVb)

wherein
Q is defined in formula (I),
R and p are defined in formula (II),
$R^1$ is $CH_2\text{—}CH(OH)\text{—}[CH_2\text{—}O]_{p'}\text{—}R$, in which p'=0 or 1,
$R^2$ is an aliphatic radical having 4 to 20 carbon atoms, an aromatic radical having 7 to 14 carbon atoms or araliphatic radical having 7 to 30 carbon atoms, and
$Y^\ominus$ is an anion selected from the group consisting of halides and sulfate or $Y^\ominus$ forms with the radical $R^2$ a radical $R^2\text{—}Y^\ominus$ in which $R^2$ is a radical $CH_2$ and $Y^\ominus$ is $COO^\ominus$.

5. The dispersion as claimed in claim 1, wherein at least 40 mol % of the radicals R include cresyl.

6. The dispersion as claimed in claim 1, wherein the one or more primary amines (A) and the one or more monoepoxides (B) are reacted in an equivalents ratio (A):(B) of from 1:1.9 to 1:1.5.

7. The dispersion as claimed in claim 1, wherein the total amount of the at least one epoxide-amine product, based on the total weight of the dispersion, is 0.1% to 10% by weight.

8. The dispersion as claimed in claim 1, the at least one epoxide-amine product being a further product of:
(a) salification and/or quaternization of the nitrogen atom introduced into the reaction product of (A) and (B) via formula (I); and/or
(b) reaction of the hydroxyl group, formed by ring opening of the epoxide ring of formula (II), and/or of the NH group, formed by equimolar reaction of a species of formula (I) with a species of formula (II), with one or more species selected from the group consisting of lactones, hydroxycarboxylic acids, lactides, monoepoxide compounds and monoisocyanates.

9. The dispersion as claimed in claim 1, the at least one epoxide-amine product being a further product of salification and/or quaternization of the nitrogen atom introduced into the reaction product of (A) and (B) via formula (I).

10. The dispersion as claimed in claim 1, the at least one epoxide-amine product being a further product of reaction of the hydroxyl group, formed by ring opening of the epoxide ring of formula (II), and/or of the NH group, formed by equimolar reaction of a species of formula (I) with a species of formula (II), with one or more species selected from the group consisting of lactones, hydroxycarboxylic acids, lactides, monoepoxide compounds and monoisocyanates.

* * * * *